3,440,204
POLYAMIDE AMIDE-ACID COATING SOLUTIONS CONTAINING A SILICONE, METHOD OF USING SAID SOLUTIONS AND SURFACES COATED THEREWITH
Donald L. Reinhard, Ballston Lake, N.Y., assignor to General Electric Company, a corporation of New York
No Drawing. Filed May 5, 1966, Ser. No. 547,789
Int. Cl. C08g 20/32
U.S. Cl. 260—33.4                              10 Claims

ABSTRACT OF THE DISCLOSURE

The smoothness of coatings prepared from cured polyamide amide-acids is improved by adding thereto from 0.05 to 0.5% of particular silicone material based on the weight of the polyamide amide-acid.

---

This invention relates to new and useful compositions of matter. More particularly, it relates to new and useful polyamide-imides and their precursor polyamide amide-acids which are characterized by their ability to form smooth coatings on structures such as electrical conductors and the like.

The preparation of polyamide-modified polyimides containing aromatic groups and their polyamide amide-acid precursors are also well known as set forth, for example, in Patent 3,179,635. Polyamide amide-acids which cure to form polyamide-imides are also prepared by reacting trimellitic anhydride derivatives such as the monoacid chloride derivatives with a diamine such as methylene dianiline. One such material is known as Amoco AI–10. While such materials are possessed of salutary physical and electrical properties, wire enamels made from such materials generally require relatively expensive solvents, such as N,N-dimethyl formamide, N-methyl-2-pyrrolidone, N,N-dimethyl acetamide, and the like.

There are also described in copending application Ser. No. 529,240, filed Feb. 23, 1966, polyamide amide-acids and resulting polyamide-imides of superior characteristics including flexibility, toughness and good electrical properties which polyamide amide-acids are soluble in and may be formed in readily obtainable and inexpensive solvents such as cresol and the like. However, it has again been found that coatings of such materials on electrical conductors and other surfaces when cured as by heat to form polyamide-imides form relatively rough, blistery and generally unacceptable coatings for electrical insulating purposes. It is a principal object of the present invention to provide smooth surface coatings of polyamide-imides from polyamide amide-acids.

Briefly, the present invention relates to compositions containing polyamide amide-acid in relatively inexpensive solvents such as cresol and the like including cresylic acid called hereafter cresol, as well as phenol and mixtures of such cresol and phenol, which contain a smoothness additive of silicone material which permits the coating of such solutions on surfaces to provide smooth, cured coatings of polyamide-imide.

The polyamide amide-acids useful in conjunction with the present invention as described in the above copending application can be prepared by reacting a polyamide-diamine material with a dianhydride. The polyamide-diamine is prepared by reacting at least one bibasic acid having the formula (I)         HOOC—R'—COOH where R' is an unsaturated or saturated aliphatic group containing from about 1 to 40 carbon atoms with at least one aromatic diamine having the formula (II)         H₂N—R''—NH₂ where R'' is a divalent radical containing at least two carbon atoms, the two amino radicals being attached to separate carbon atoms of the divalent group.

Among the aliphatic dibasic acids which may be utilized are oxalic, maleic, succinic, glutaric, adipic, pimelic, suberic, azelaic, sebacic and dodecanedioic acids, as well as unsaturated acids falling within the above formula including maleic and fumaric acids, among others.

Among the diamines which may be used are those listed in Patent 3,179,614, and elsewhere, including benzidine, 4,4'-diaminodiphenyl ether, 3,3'-dimethoxy-4,4'-diaminodiphenyl methane, meta-phenylenediamine, para-phenylenediamine, and others.

In preparing the polyamide-diamine, dibasic acid is reacted with diamine, which latter is about one mole in excess, in a cresol solution to form about a 50% by weight solution. Typically, the reactant mixture is refluxed with stirring for about 1½ to 7 hours with distillation of water from the mixture. When the formation of the polyamide-diamine is complete, the reaction mixture is diluted to about 25% solids with cresol and cooled to about 100° C. Dianhydride is then added in cresol solution to the reaction mixture and reacted for about 10 minutes at about 100° C. to produce the polyamide amide-acid which can be further converted as by heat to the imide stage. A particular advantage of the present process, it will be seen, is that it can be a pseudo one-step preparation.

The polyamide-diamine may be expressed by the formula (III) 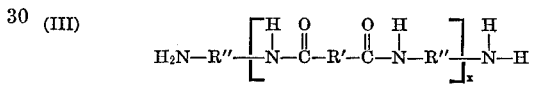

where R' is a saturated or unsaturated aliphatic hydrocarbon group containing from about 1 to 40 carbon atoms as above, R'' is a divalent group as above, and $x$ varies from about 1 to 3. Generally speaking, increasing $x$ above 3 produces increasingly brittle final polymers which, while useful for some purposes, do not provide flexible, tough films and coating materials. However, the diamine itself may be of any length as such.

In preparing the polyamide amide-acid, the amine-terminated polyamide is reacted in essentially equimolar amounts with a dianhydride having the formula (IV) 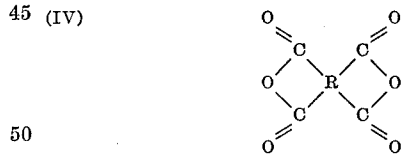

wherein R is a tetravalent organic radical containing at least two carbon atoms selected from substituted and unsubstituted aliphatic, cycloaliphatic, heterocyclic, aromatic and combinations of such groups. Among the anhydrides useful in this connection are pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
bis(3,4-dicarboxyphenyl) sulfone dianhydride,
perylene 3,4,9,10-tetracarboxylic acid dianhydride,
bis(3,4-dicarboxyphenyl) ether dianhydride,
naphthalene-1,2,4,5-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride, benzene-1,2,3,4-tetracarboxylic dianhydride,
pyrazine-2,3,5,6-tetracarboxylic dianhydride,
thiophene-2,3,4,5-tetracarboxylic dianhydride,
3,4,3′,4′-benzophenone tetracarboxylic dianhydride, etc.

The reaction between the dianhydride and polyamide-diamine is generally carried out by dissolving the anhydride in enough cresol to produce a solids content of about 20% by weight, adding to the polyamide-amine and reacting for about ten minutes at 100° C., cooling to about 40–50° C. and removing from the reaction kettle, the final product being a polyamide amide-acid having the general formula (V) 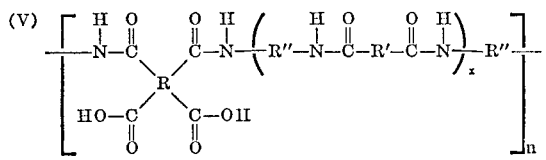

where R, R′, R″ and x are as above and n is at least 2. When heated at a temperature of about 250° C. or higher for times ranging from about 5 minutes upward, the polyamide amide-acid is converted to a polyamide-imide having the formula (VI) 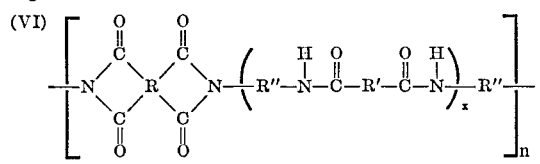

where the various constituents are as above.

The silicone smoothness additive useful in connection with the present invention can be expressed by the formula (VII) 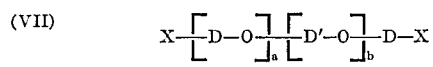

where:

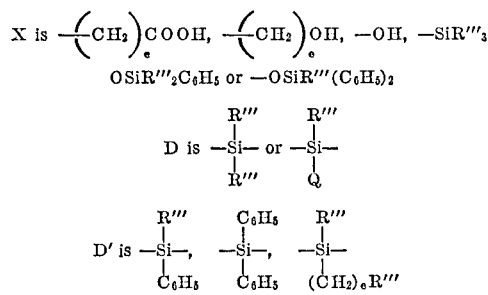

the total substituents on D and D′ having less than 50% phenyl groups,

R‴ is an alkyl radical of from 1 to 4 carbon atoms,
R⁗ is —CN or —COOR‴″,
R‴″ is H, R‴, $C_qF_{2q}H$, or $CF_3$,
a is a whole number in excess of one and preferably from 4 to greater than 100,
b is a whole number from 0 to less than 25,
e is a whole number from 1 to 4, and
q is a whole number from 1 to 11.

Silicone materials of the above types are well known in the art. For example, cyanoalkyl materials are described in U.S. Patents 3,185,663 and 3,185,719; perfluoroalkyl materials are described in Patent 2,979,519; and carboxyalkyl materials of this type are described in Patents 3,177,178; 2,875,177 and 2,900,363, while esters of carboxyalkyl materials of this type are described in Patent 3,065,202. Hydroxy chain-stopped materials of this type are described in Patent 2,843,555.

It has been found that from about 0.05 to 0.5% of the silicone material based on polymer solids, when added to the polyamide amide-acid solution, provides an enamel or coating composition which will smoothly coat and cure, as under heat, to provide an even, smooth and blister-free protective or electrical insulating coating. Less than the above amount of smoothness additive does not produce the desired smoothness and larger amounts do not appear to improve the smoothness obtained with the above amounts.

The following example illustrates the preparation of a polyamide amide-acid solution useful in the present connection.

Example 1

There were placed in a reaction flask equipped with stirrer, Dean-Stark trap, condenser, heating mantle and nitrogen purge system 144 g. (0.73 mole) p,p′-diaminodiphenyl methane (methylene dianiline) 69 g. (0.364 mole) azelaic acid and 200 g. of cresol, the mixture being stirred and heated at reflux from 205° C. to 220° C. under nitrogen for about four hours, water formed passing into the trap. The reaction mixture was then diluted with about 520 g. of cresol and cooled to 90° C. This represents the preparation of a polyamide-diamine intermediate. To the above solution there was added a solution containing 116 g. (0.36 mole) 3,3′,4,4′-benzophenone tetracarboxylic dianhydride (benzophenone dianhydride) in 920 g. of cresol. The reactant mixture was stirred for five minutes at 90° C. and then cooled to 50° C. The resulting polyamide amide-acid solution containing 17.8% solids was a clear, viscous material. When this solution was coated on a 0.0403″ diameter copper wire in a vertical wire tower using conventional wire enameling techniques to a build of 2.2 mils, the speed through the tower being 6 feet per minute with the temperature at the bottom of the tower 135° C. and the temperature at the top 400° C., the resulting cured polyamide-imide coating was very rough and not commercially acceptable.

Example 2

To the polyamide amide-acid of Example 1 there was added 0.3 weight percent, based on the polymer solids content, of commercially available silanol chain-stopped linear polysiloxane consisting of dimethyl siloxy and diphenyl siloxy units within the scope of Formula VII. This material with smoothness additive was coated on a wire as in Example 1 and cured in a similar vertical wire tower at a wire speed of 5 feet per minute to a total build of 2.2 mils in six passes. The polyamide-imide surface of the wire was very smooth and the cut-through temperature was about 390° C. The 60-cycle dissipation factor at 250° C. was 50%. The sudden stretch test was OK and the flexibility as measured according to the same patent was 25%+2X.

Example 3

Example 2 was repeated, the wire speed through the tower being 7′ per minute and the total build 2.1 mils. The flexibility of the resulting coated wire was 25%+2X and the cut-through temperature was about 325° C. with the dissipation factor at 233° C. being 50%. The coating on the conductor was very smooth and flexible.

Example 4

Example 2 was repeated using a wire speed through the tower of 6 feet per minute with the total build being 2.2 mils. Once again, a very smooth coating was obtained with the sudden stretch test being acceptable and the flexibility as measured above being 25%+2X. The cut-through temperature was about 380° C. and the thermal life measured according to IEEE No. 57 was 200 hours at 300° C. while the dissipation factor at 240° C. was 50%.

Example 5

This example illustrates the practice of the present invention using as the polyamide amide-acid containing material a composition prepared by reacting the monoacid chloride derivative of trimellitic anhydride with methylene dianiline, such material being known commercially as Amoco AI-10 by its manufacturer, the Standard Oil Company (Indiana).

To 76.4 parts of cresol and 4.5 parts of ammonium acetate, the latter added as a viscosity control agent there was slowly added over a period of about 10 minutes at room temperature 19.1 parts of the above AI-10 polymer. Stirring was continued for about six hours and the contents allowed to remain at room temparature for about 24 hours. At this point, 0.3% by weight based on the weight of the polymer solids of the above silicone acid solution was added to the above polymer solution. When the sample was applied to 0.0403" diameter copper wire on a 5' wire coating tower having a botton temperature of 150° C. and a top temperature of 400° C. at a wire speed of 6 feet per minute to a build of 2.3 mils, a smooth coating resulted. Furthermore, the cut-through temperature of the insulated wire was 360° C. the flexibility was 25%+3X and the snap elongation was satisfactory. All in all, this material provided a good electrically insulated conductor. On the other hand, when the above silicone material was not added, the surface of the insulating coating was rough and unacceptable.

Example 6

To a 20% by weight solution of the polyamide amide-acid of Example 1 in cresol there was added 0.3 weight percent based on the polymer solids content of dimethyl siloxy polymer with terminal alkyl carboxy groups. This material, with silicone smoothness additive, was coated on a wire as in Example 1 and cured similarly in a wire tower at a wire speed of 6 feet per minute to a total build of 2.4 mils in six passes. The surface of the polyamide-imide coated wire was very smooth. The sudden stretch test was satisfactory and the flexibility was 25%+2X. When this example was repeated without the silicone additive, the surface was found to be rough and unsuitable for an electrical insulating coating.

There are provided by the present invention polyamide amide-acid containing materials which form smooth and electrically insulating and protective coatings on wires and other structures.

What I claim as new and desire to secure by Letters Patent of the United States is:

1. A polyamide amide-acid coating solution which on curing produces a polyamide imide, said solution having a solvent selected from cresol, phenol and mixtures thereof and a smoothness additive having the Formula VII, said additive being present in the amount of from about 0.05% to 0.5% based on the weight of said polyamide amide-acid.

2. A coating solution as in claim 1 where said polyamide amide-acid has the Formula V.

3. A coating solution as in claim 1 where said polyamide amide-acid is the reaction product of diamine and the monoacid chloride of trimellitic anhydride.

4. A coating solution as in claim 1 wherein said additive is a silanol chain-stopped linear polysiloxane consisting of dimethyl siloxy and diphenyl siloxy units within the scope of Formula VII.

5. A coating solution as in claim 1 wherein said additive is dimethyl siloxy polymer with terminal alkyl carboxy groups.

6. The cured solution of claim 1.

7. A structure coated with the coating solution of claim 1.

8. A structure coated with the cured coating solution of claim 1.

9. A coating solution as in claim 1 where said smoothness additive is present in the amount of about .3% based on the weight of said polyamide amide-acid.

10. The process of providing smooth, cured coatings of polyamide-imides on a structure which comprises dissolving the precursor polyamide amide-acid in a solvent selected from cresol and phenol and mixtures thereof, adding to said solution from about 0.05% to 0.5% based on the weight of said polyamide amide-acid of an additive having the Formula VII.

References Cited

UNITED STATES PATENTS

| | | |
|---|---|---|
| 3,288,754 | 11/1966 | Green. |
| 3,260,691 | 7/1966 | Lavin. |
| 3,277,043 | 10/1966 | Holub. |
| 3,179,614 | 4/1965 | Edwards _____ 260—30.8 |
| 3,320,202 | 5/1967 | Bolton _____ 260—30.2 |
| 3,242,136 | 3/1966 | Endrey _____ 260—30.2 |

OTHER REFERENCES

Freeman: "Silicones" 1962, pp. 35 and 36.

ALLAN LIEBERMAN, *Primary Examiner.*

U.S. Cl. X.R.

260—78